United States Patent
Tamaoka et al.

(10) Patent No.: US 7,940,493 B2
(45) Date of Patent: May 10, 2011

(54) SPINDLE MOTOR INCLUDING FLEXIBLE CIRCUIT SUBSTRATE AND RECORDING DISK DRIVE HAVING THE SPINDLE MOTOR

(75) Inventors: Takehito Tamaoka, Kyoto (JP); Hiroomi Ogawa, Ichinomiya (JP)

(73) Assignee: Nidec Corporation, Kyoto (JP)

( * ) Notice: Subject to any disclaimer, the term of this patent is extended or adjusted under 35 U.S.C. 154(b) by 162 days.

(21) Appl. No.: 12/389,450

(22) Filed: Feb. 20, 2009

(65) Prior Publication Data
US 2009/0154008 A1 Jun. 18, 2009

Related U.S. Application Data

(62) Division of application No. 11/425,152, filed on Jun. 20, 2006, now Pat. No. 7,515,379.

(30) Foreign Application Priority Data

Jun. 20, 2005 (JP) ................................. 2005-179292
Apr. 20, 2006 (JP) ................................. 2006-116845

(51) Int. Cl.
  *G11B 17/02* (2006.01)
  *H02K 5/16* (2006.01)
(52) U.S. Cl. ................................. 360/99.08; 310/67 R
(58) Field of Classification Search ............... 360/99.08, 360/99.04; 310/67 R, 90, 90.5
See application file for complete search history.

(56) References Cited

U.S. PATENT DOCUMENTS

| | | | |
|---|---|---|---|
| 5,367,416 A | 11/1994 | Cossette et al. | |
| 6,097,121 A | 8/2000 | Oku | |
| 6,664,686 B2 | 12/2003 | Ichiyama | |
| 6,778,203 B2 | 8/2004 | Itami et al. | |
| 6,980,394 B2 | 12/2005 | Inoue et al. | |
| 7,105,970 B2 | 9/2006 | Yajima et al. | |
| 7,515,379 B2 * | 4/2009 | Tamaoka et al. | 360/99.08 |
| 7,518,823 B2 * | 4/2009 | Albrecht et al. | 360/99.08 |
| 7,542,232 B2 * | 6/2009 | Watanabe et al. | 360/99.08 |
| 2002/0117909 A1 | 8/2002 | Gomyo | |
| 2004/0179294 A1 | 9/2004 | Asada et al. | |
| 2005/0264121 A1 | 12/2005 | Yajima et al. | |
| 2005/0264929 A1 * | 12/2005 | Sato et al. | 360/99.12 |
| 2006/0139800 A1 * | 6/2006 | Takahashi | 360/99.12 |
| 2006/0221495 A1 | 10/2006 | Tamaoka et al. | |
| 2006/0227455 A1 | 10/2006 | Tamaoka et al. | |

FOREIGN PATENT DOCUMENTS

JP 2004282880 10/2004

* cited by examiner

*Primary Examiner* — Brian E Miller
(74) *Attorney, Agent, or Firm* — Volentine & Whitt, PLLC (57) ABSTRACT

Using a simple and inexpensive method, a reliable spindle motor having a simple and inexpensive structure is afforded, in which contact failure of the FPC does not occur even when the motor undergoes external impact. An extending portion is provided radially outer side of an annular recess of a base. The extending portion has a step whose radially outer side is higher, and a through hole formed such as to pass through the base from its inside to outside. A FPC is disposed on an upper surface of a stator. The FPC is fixed to a lower surface of the base through the through hole. The bending height and the bending angle of the FPC are minimized by providing the step having appropriate height so that the FPC is not easily peeled off even when subject to external impact.

3 Claims, 7 Drawing Sheets

*Prior Art*

SPINDLE MOTOR INCLUDING FLEXIBLE CIRCUIT SUBSTRATE AND RECORDING DISK DRIVE HAVING THE SPINDLE MOTOR

CROSS-REFERENCE TO RELATED APPLICATION

This is a divisional of application Ser. No. 11/425,152, filed Jun. 20, 2006, which is incorporated herein by reference in its entirety.

BACKGROUND OF THE INVENTION

1. Technical Field

The present invention relates to a spindle motor, more particularly, to an inner rotor type spindle motor which is required to be thinner, and to a recording disk drive having the spindle motor.

2. Description of the Related Art

In recent years, signal recording/reproducing devices such as hard disk drives (HDDs, hereinafter) are incorporated in portable devices such as cell phones, and this tendency accelerates size and thickness reductions of HDDs from year to year. In addition, when the signal recording/reproducing devices such as hard disk drives are incorporated in the portable devices, as compared with a conventional case where they are incorporated in personal computers, it is required to largely enhance a resistance against an external impact such as a drop impact. In correspondence with these requirements of the HDD, a spindle motor to be incorporated in the HDD is also increasingly required to reduce its size and thickness and to enhance the impact resistance. To meet the requirements, types of spindle motors are moving to an inner rotor type spindle motor in which a stationary member surrounds a rotor and a fluid dynamic pressure bearing utilizing dynamic pressure generated by fluid.

A conventional structure will be described later herein with reference to FIG. 5A by way of contrast with an embodiment of the present invention. Generally, however, according to this inner rotor type spindle motor, although the impact resistance around the bearing can be enhanced, the enhancement of the impact resistance against the mounting manner of other portions, especially a flexible printed circuits (FPC, hereinafter) is not yet sufficient. For example, it is necessary to install wires from inside to outside of a base using the FPC for supplying power, but since it is necessary to install the wire in a narrow space, a FPC disposed on a stator is bent at a sharp angle and fixed on a lower surface of the base when the FPC passes through a through hole of the base. If the FPC is strongly bent, the FPC exhibits a great resilience for returning the FPC to its original state, a force for always separating the base is strongly applied to a lower surface of the base that is a mounting location of the outside of the base. Therefore, when an external impact is applied when a portable device falls, there is a high risk that the FPC is easily peeled off from the base and a contact failure occurs between an external power supply and an external connect portion formed on a lower surface of the base of the FPC. It can also be contemplate to incline a hole so that a wire can be installed easily, but it is difficult to form a hole which is inclined with respect to a small base, and there is a drawback that the cost is increased correspondingly.

BRIEF SUMMARY OF THE INVENTION

The present invention has been accomplished in view of a contact failure which occurs when the above-described impact is applied, and it is an object of the invention to provide a reliably spindle motor in which a contact failure of a FPC does not occurs by devising easy and inexpensive method and structure.

As a preferred embodiment, in the spindle motor of the present invention, a base has an annular recess which opens upward in an center axis direction. The recess accommodates a stator. An extending portion is provided on the base on a radially outer side of the annular recess. The extending portion has a step and a through hole. A portion of the step on the radially outer side is higher than a portion of the step on the radially inner side. The through hole penetrates the base from inside to outside. With this structure, a FPC whose one end is connected to an upper surface of the stator does not pass through the through hole and is not largely bent during wiring process in which the FPC is fixed to the lower surface of the base through the through hole. It is preferable that the open end surface of the through hole is provided with the inclined surface so that wire can be installed more smoothly. Bending resilience acting in a direction in which the FPC is peeled off is restrained from being generated, the FPC is strongly fixed. Therefore, the FPC can not be peeled easily even when an external impact is applied, and connection between the FPC and an external power supply can be maintained.

As another preferred embodiment, in the recording disk drive of the present invention, the spindle motor of the invention is used. Thus, connection between the FPC and an external power supply can be maintained even when an external impact is applied. Therefore, it is possible to provide a reliable recording disk drive.

The above and other objects and effects of the present invention will be apparent from the following detailed description.

DETAILED DESCRIPTION OF THE INVENTION

Best Mode for Carrying Out the Invention

A spindle motor and a recording disk drive having the spindle motor according to an embodiment of the invention will be hereinafter explained with reference to FIGS. 1 to 7. In the description of the embodiments of the invention, a vertical direction of each drawing is described as a "vertical direction" but this does not limit a direction in an actual mounted state.

First Embodiment

Recording Disk Drive

Figure 1:
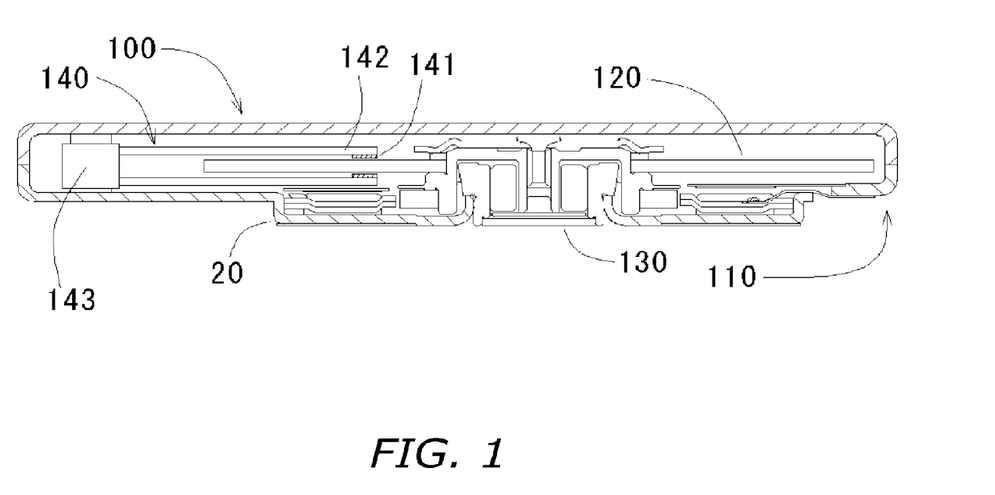
FIG. 1 is a schematic sectional view showing a recording disk drive of a first embodiment of the present invention.

One mode of the embodiment of a recording disk drive 100 according to the present invention will be explained with reference to FIG. 1. FIG. 1 is a sectional view of the recording disk drive 100.

The recording disk drive 100 is configured such that it is accommodated in a box-like housing 110. A clean space having extremely little dust is formed in the housing 110. A spindle motor 130 having a disk-like hard disk 120 which rotates at high speed around a rotation center axis is disposed in the space. The housing 110 and a later-described base 10 may integrally be formed together.

A head moving mechanism 140 which swaps information with the hard disk 120 is disposed in the housing 110. The head moving mechanism 140 includes a magnetic head 141 which writes and reads information on the hard disk 120, an arm 142 which supports the magnetic head 141, and an actuator 143 which moves the magnetic head 141 and the arm 142 to a desired position on the hard disk 120.

If the spindle motor of the present invention is applied as the spindle motor 130 of the recording disk drive 100, it is possible to reduce size and thickness of the recording disk drive 100 while securing sufficient function, and to provide a reliably recording disk drive having high durability.

Structure of Spindle Motor

Figure 2:
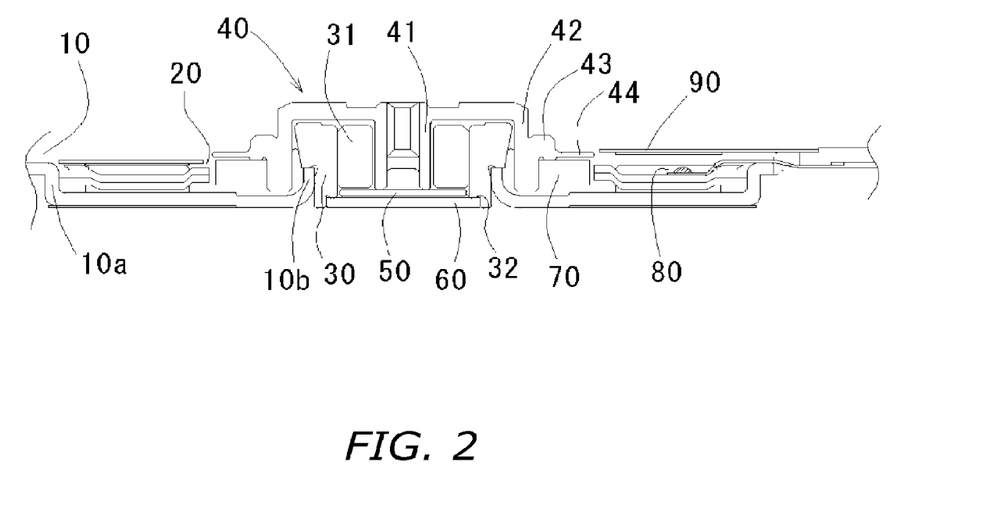
FIG. 2 is a schematic vertical sectional view showing the spindle motor of the first embodiment of the invention.

Next, with reference to FIG. 2, the entire structure of the spindle motor of the invention will be explained. FIG. 2 is a schematic sectional view showing one mode of the embodiment of the spindle motor of the invention. A term "vertical direction" in the specification means a vertical direction in FIG. 1.

In the spindle motor shown in FIG. 2, a base 10 is formed of non-magnetic steel plate by means of plastic working such as press working, and the base 10 is formed with an annular recess 10*a*. The recess 10*a* is surrounded in its circumferential direction by two cylindrical wall surfaces of a small-diameter sidewall 10*b* and a large-diameter sidewall 10*c*. The small-diameter sidewall 10*b* and the large-diameter sidewall 10*c* are coaxial with each other and have different radii. The recess 10*a* is formed into an annular groove-like shape whose lower side in a rotation axis is closed with a bottom 10*d* and whose upper side in the rotation axis is opened.

An annular stator 20 is fitted into and fixed to an inner peripheral surface of the large-diameter sidewall 10*c* such that the annular recess 10*a* is coaxial with the rotation center axis. A substantially cylindrical bearing holding member 30 is coaxially fitted to and fixed to an inner peripheral surface of the small-diameter sidewall 10*b*. A cylindrical bearing sleeve 31 is coaxially fixed into and fixed to an inner peripheral surface of the bearing holding member 30.

A shaft 41 is inserted into the bearing sleeve 31 with a fine gap interposed therebetween such that the shaft 41 is coaxial with the rotation center axis. The shaft 41 is rotatably supported through lubricating fluid charged into the fine gap. An upper portion of the shaft 41 is formed into rotor hub 40. The rotor hub 40 is made of strong magnetic material, and is formed into a substantially cylindrical shape provided at its radially outward portion with a cylindrical portion 42. The rotor hub 40 surrounds upper portions and outer peripheries of the bearing holding member 30 and the bearing sleeve 31.

A thrust plate 50 which is greater than an outer diameter of the shaft 41 is fixed to a lower end of the shaft 41. The bearing holding member 30 is provided at its lower portion with a plate-fixing portion 32. A disc-like plate 60 is fixed to the plate-fixing portion 32 so that the bearing holding member 30 is formed into a bottomed container structure. A periphery of the thrust plate 50 is surrounded by the bearing holding member 30, the bearing sleeve 31 and the plate 60.

A dynamic pressure generating groove is formed in at least one of an outer peripheral surface of the shaft 41 and an inner peripheral surface of the bearing sleeve 31. The shaft 41 is supported in the radial direction by a fluid pressure generated by the dynamic pressure generating groove. A dynamic pressure groove is formed in at least one or more of a lower surface of the bearing sleeve 31, an upper surface and a lower surface of the thrust plate 50 and an upper surface of the plate 60. The shaft 41 is supported in the axial direction by a fluid pressure generated by the dynamic pressure generating groove.

A disk-mounting surface 43 is formed on an outer peripheral surface of a cylindrical portion 42 of the rotor hub 40. The disk-mounting surface 43 projects radially outward. A magnetic cover 44 projecting radially outward is formed on an outer peripheral surface of the disk-mounting surface 43. A rotor magnet 70 is fixed to and mounted on an outer peripheral surface of the cylindrical portion 42 located below the disk-mounting surface 43. An upper portion of the rotor magnet 70 is covered with a magnetic cover 44, and an outer peripheral surface of the rotor magnet 70 is opposed to the stator 20 at a small distance.

A FPC 80 is fixed to and disposed on an upper side of the stator 20, and a shield plate 90 is disposed above the FPC 80.

If the stator 20 is energized by an external power supply (not shown) through the FPC 80, a magnetic field is formed around the stator 20. A predetermined rotation torque is obtained by interaction between the magnetic field and the rotor magnet 70, and it is rotated and driven.

Essential Portion

Figure 3:
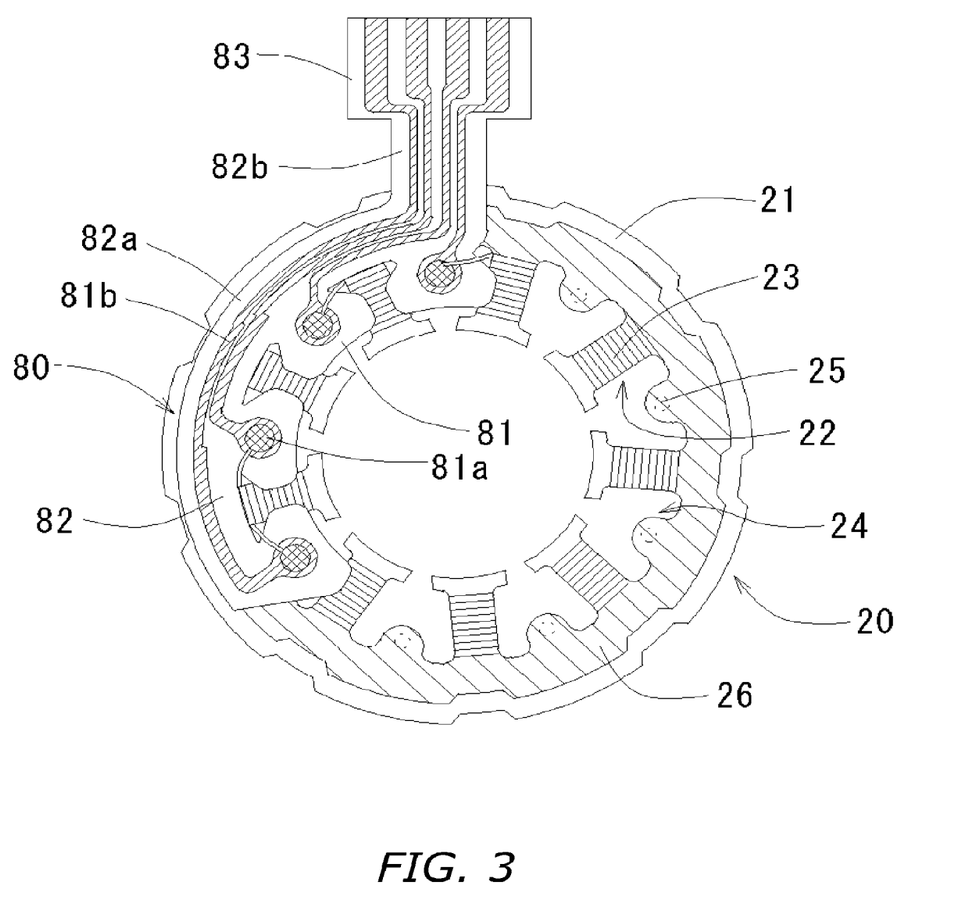
FIG. 3 is a diagram showing peripheries of a base and a stator of the spindle motor of the first embodiment of the invention.
Figure 4:
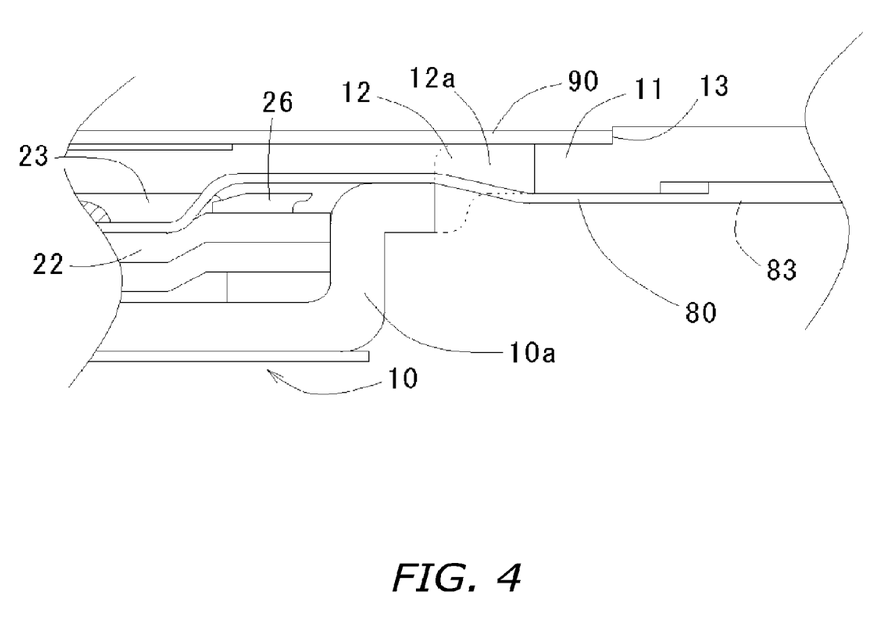
FIG. 4 is an enlarged diagram of an essential portion of the spindle motor of the first embodiment of the invention.
Figure 6:
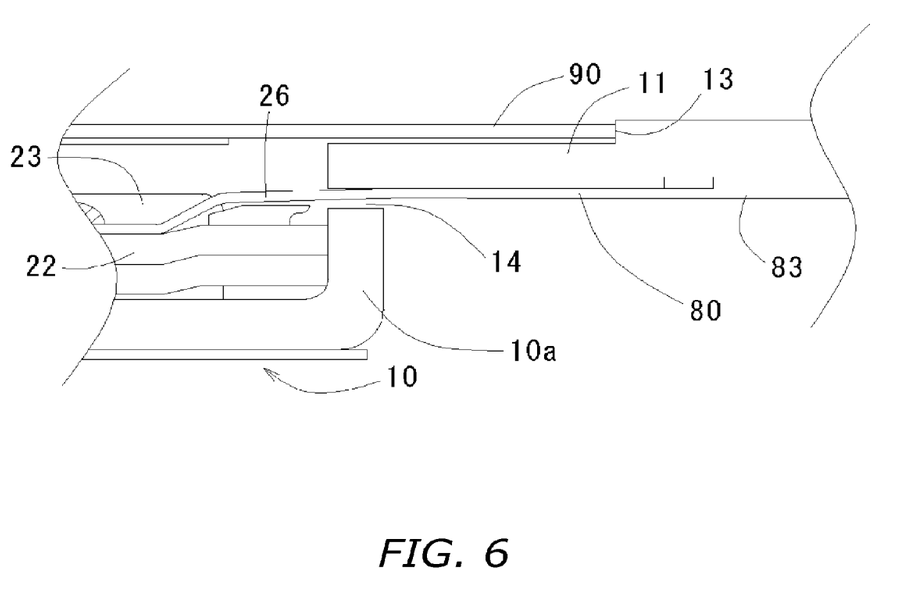
FIG. 6 is an enlarged diagram of an essential portion of a spindle motor of a second embodiment of the invention.
Figure 7:
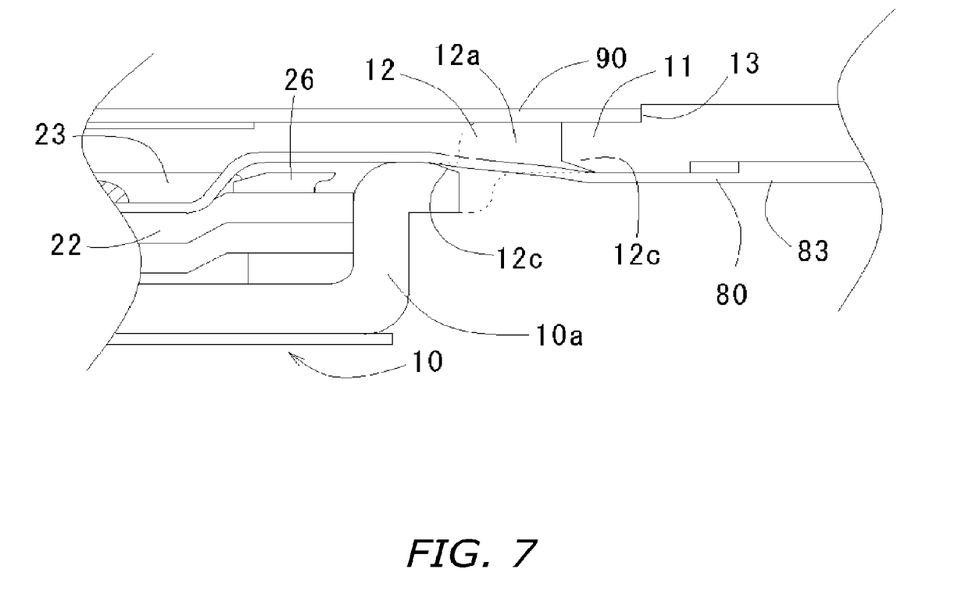
FIG. 7 is an enlarged diagram of an essential portion of a spindle motor of a third embodiment of the invention.

Next, a relation between a periphery of the stator 20 and the base 10 which are essential portions of the invention will be explained with reference to FIGS. 3 to 7. FIG. 3 shows a relation between the stator 20 and the FPC 80. FIG. 4 is an enlarged diagram of an essential portion of FIG. 2. FIG. 5 show the embodiment of the invention shown in FIG. 4 and an example of the conventional structure in comparison, wherein FIG. 5A shows the conventional example and FIG. 5B shows the present invention. FIGS. 6 and 7 show other embodiments of the essential portion of the invention.

As shown in FIG. 3, the stator 20 is formed in such a manner that a plurality of thin plates are laminated and mounted on one another, each thin plate has a plurality of teeth 22 projected from an annular core back 21 radially inward, the teeth 22 are provided at equal distances from one another in the circumferential direction, and a winding 23 is wound around each tooth 22. The spindle motor of the invention is a three-phase drive motor, the three phases are U-phase, V-phase and W-phase. The spindle motor includes a common phase as a connection of these phases. Therefore, the number of terminals of the winding 23 is four. Radially inwardly projecting projections 24 project from respective intermediate positions between adjacent teeth 22 in the circumferential direction. Each projection 24 is formed with a circular through hole 25. A substantially annular insulator 26 made of insulating material is fitted into and fixed to the holes 25. The insulator 26 functions to cover an interior of the core back 21 from above, and retain a crossover of the winding. The FPC 80 is fixed to the windings 23 by means of adhesive such as to cover an upper side of the core back 21 of the stator 20 and spaces between adjacent teeth 22. The FPC 80 is disposed at a location out from a moving range of the head moving mechanism 140. The FPC 80 is of substantially arc shape, and is provided with four projections 81 projecting radially inward. Each projection 81 is formed at its central portion with a land 81a. The windings 23 are connected to and fixed to the lands 81a through conductive members such as solder to electrically connect the windings 23 and the FPC 80. This is because that if the FPC 80 is disposed below the stator 20, it becomes difficult to fix the lands 81a and the windings 23 to each other. If the FPC 80 is disposed above the stator 20, on the other hand, it becomes easy to fix the lands 81a and the windings 23 to each other. A main body 82 of the FPC 80 has such a wiring structure that the four lands 81a become land wires 81b, respectively, and each land wire 81b is connected to an external connecting portion 83 provided above the main body 82 which is wider than a straight portion 82b through an arc portion 82a and a straight portion 82b. The external connecting portion 83 and the external power supply (not shown) are connected to each other and are energized, the windings 23 are energized.

As shown in FIG. 4, the base 10 is provided with an extending portion 11 extending radially outward. The extending portion 11 is located on a radially outer side as compared with the annular recess 10a as viewed from a center axis. The extending portion 11 is provided with a step 12. A step-like shield plate fixing portion 13 is provided on a further radially outer side for fixing an annular shield plate 90 which covers the extending portion 11 and the stator 20.

The step 12 is formed with a through hole 12a having almost the same width as that of the external connecting portion 83. The straight portion 82b and the external connecting portion 83 of the FPC 80 are inserted into the through hole 12a, and the FPC 80 is disposed on a lower surface of the extending portion 11 located outside of the base 10. Therefore, the FPC 80 disposed on the upper surface of the stator 20 is first temporarily attached to an upper surface of the extending portion 11, the FPC 80 passes through the through hole 12a and comes outside from the inside of the housing 110, and is lastly fixed to the lower surface of the base 10. When the FPC 80 and the lower surface of the base 10 are to be fixed to each other, an adhesive is previously applied to the FPC 80. With this, they can easily be fixed to each other. If the adhesive is charged such that the upper surface of the FPC 80 and the through hole 12a of the extending portion 11 are filled with adhesive, the extending portion 11 and the FPC 80 can reliably be fixed to each other. With this, the FPC 80 can come into direct contact with the external power supply, and electricity can be supplied from the external power supply. If the extending portion 11 is provided with the step 12, it is possible to suppress the axial bending of the FPC 80, and the bending angle of the FPC 80 can be reduced. Thus, a resilience generated when the FPC 80 is bent can be reduced. With this configuration, the external connecting portion 83 of the FPC 80 does not come out from the extending portion 11 even when external impact is applied. Thus, it is possible to provide a reliable spindle motor. Especially, it is preferable that a radially inner side of the step 12 as viewed from the rotation center axis is low and a radially outer side of the step 12 is high so as to reduce the axial bending of the FPC 80.

Essential portions of the present invention will be explained mainly based on differences caused by structures concerning bending of the FPC 80 by comparing bending angles and bending heights of the FPC 80 in a conventional structure and the embodiment of the present invention with reference to FIG. 5.

Figure 5A:
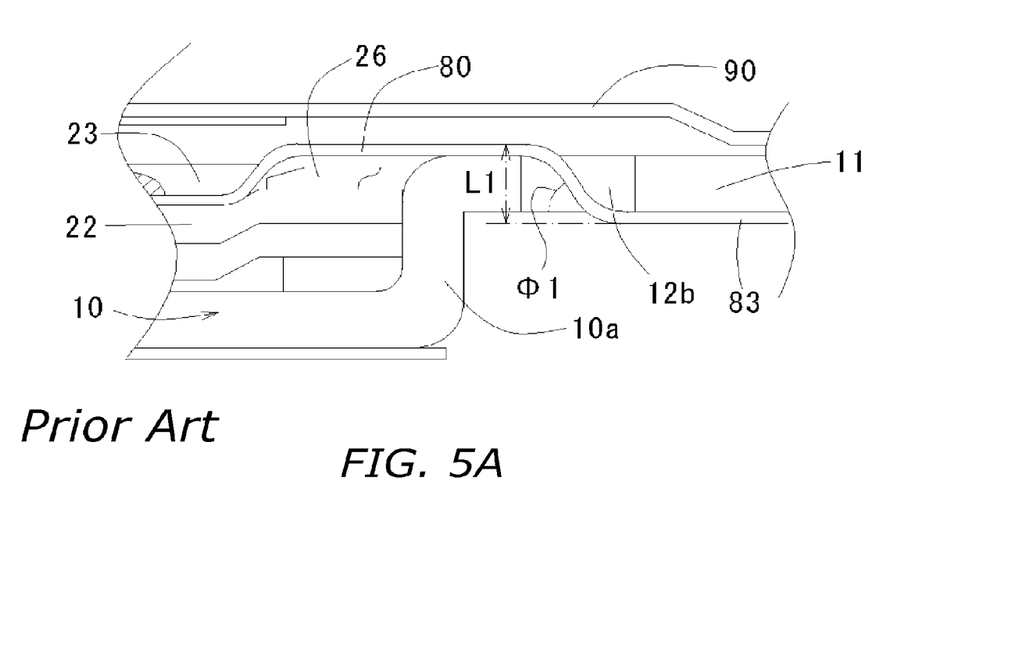
FIG. 5A is an enlarged diagram of an essential portion of a conventional spindle motor.
Figure 5B:
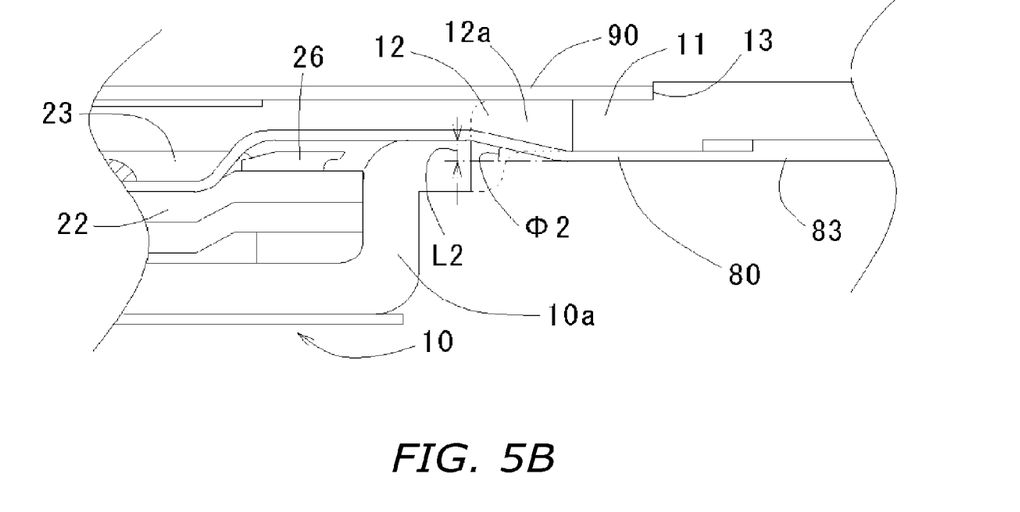
FIG. 5B is an enlarged diagram of an essential portion of the spindle motor of the first embodiment of the invention.

In the conventional structure shown in FIG. 5A, the extending portion 11 of the base 10 is provided with a through hole 12b in the direction of the rotation center axis.

Here, L1 and L2 are bending heights from a lower surface of the FPC 80 mounted on the lower surface of the base 10 to an upper surface of the FPC 80 fixed to the extending portion 11. Further, .phi.1 and .phi.2 are bending angles formed between the FPC 80 mounted on the lower surface of the base 10 and portions of the FPC 80 which pass through the respective through holes 12a and 12b.

In the conventional structure, a vertical difference between the upper surface and the lower surface of the extending portion 11 is great and thus, the bending height L1 of the FPC 80 is increased correspondingly. Further, to prevent dust from entering from the outside of the HDD, it is necessary to reduce a radial opening as viewed from the rotation center axis of the through hole 12b. Therefore, the bending angle .phi.1 is increased consequentially. If the bending height L1 and the bending angle .phi.1 are increased, the bending resilience of the FPC 80 is also increased. Thus, a force applied to the external connecting portion 83 which is fixed to the lower surface of the base 10 is increased, and the FPC 80 is prone to be peeled off.

In comparison with the conventional structure shown in FIG. 5A, according to the embodiment of the present invention shown in FIG. 5B, the vertical difference between the upper surface and the lower surface of the extending portion 11 is reduced by providing the step 12, i.e., by forming the step such that a portion of the upper surface of the extending portion 11 on the radially outer side as viewed from the rotation center axis becomes higher than a portion of the upper surface of the extending portion 11 on the radially inner side. With this, the bending height L2 and the bending angle .phi.2 can be reduced. Therefore, the bending resilience of the FPC 80 is reduced, a force applied to the external connecting portion 83 which is fixed to the lower surface of the extending portion 11 becomes smaller and thus, the FPC 80 becomes less prone to be peeled off. As a result, the contact failure of the external connecting portion 83 is less prone to occur, and a reliably spindle motor can be provided. The step 12 can be formed by reducing the upper surface side height of the extending portion 11 such that a portion of the upper surface on the radially inner side becomes lower than a portion of the upper surface on the radially outer side as viewed from the rotation center axis.

It is preferable that an axial height position of an end surface of an upper portion of the large-diameter sidewall 10c constituting the annular recess 10a of the base 10 is higher than an axial height position of an end surface of an upper portion of the core back 21 of the stator 20, and is lower than an axial height position of the upper surface of the winding 23. If the axial height position of the end surface of the upper portion of the large-diameter sidewall 10c is within this range, an axial height position of the through hole 12a formed in the extending portion 11 is substantially equal to an axial height position of the FPC 80. Thus, it is possible to fix the external connecting portion 83 to the lower surface of the extending portion 11 without bending the FPC 80 almost at all.

Second Embodiment

Next, a second embodiment will be explained with reference to FIG. 6. Since a motor of this embodiment has basically the same structure as that of the first embodiment, only different portions will be explained.

As shown in FIG. 6, in the second embodiment, a through hole 14 is oriented in the radial direction of the large-diameter sidewall 10c. With this, it is possible to fix the external connecting portion 83 to the lower surface of the extending portion 11 without bending the FPC 80 almost at all. Thus, it is unnecessary to form the step 12 and it is possible to thin the base 10. This structure is suitable when there is a margin in the axial height between the upper surface of the stator 20 and the disk-mounting surface 43 of the rotor hub 40, or when a space for providing the step 12 is not enough.

It is difficult to form the through hole 12a provided in the step 12 or the through hole 14 provided in the large-diameter sidewall 10c after the step 12 of the base 10 and the annular recess 10a are formed, and the operation efficiency is deteriorated. Thus, it is preferable that the through hole 12a or the through hole 14 is formed before the step 12 of the base 10 and the annular recess 10a are formed.

A recessed guide groove 17 having substantially the same width as that of the FPC 80 is provided on the upper surface of the extending portion 11 forming the step 12 at a location on the radially inner side than the through hole 12a as viewed from the rotation center axis. With this, it becomes easy to position the straight portion 82b of the FPC 80. As a result, it becomes easy to position the external connecting portion 83. If the FPC 80 is deviated in position, a large force is applied to the FPC 80 and there is a danger that the FPC 80 is peeled off, but if the FPC 80 is positioned by the recessed guide groove 17, it is possible to prevent the above inconvenience from being generated.

According to the second embodiment, the same effect as that of the first embodiment can be obtained.

Third Embodiment

Next, a third embodiment will be explained with reference to FIG. 7. Since a motor of this embodiment has basically the same structure as that of the first embodiment, only different portions will be explained.

As shown in FIG. 7, in the third embodiment, an inclined surface 12c is provided on each of an upper surface of the through hole 12a on the radially inner side and a lower surface of the through hole 12a on the radially outer side as viewed from the rotation center axis. Each the inclined surface 12c is inclined in such a direction that a diameter of an end surface of the through hole 12a is increased. This structure is preferable because the bending angle of the FPC 80 can further be reduced. This effect can be exhibited only if the inclined surface 12c is provided at least on a lower side of the step 12 (on radially inner side of the through hole 12a as viewed from the rotation center axis in FIG. 7).

According to the third embodiment, the same effect as that of the first embodiment can be obtained.

Although the embodiments of the spindle motor and the recording disk drive having the spindle motor according to the present invention have been explained above, the invention is not limited to the embodiments, and the invention can variously be modified or improved without departing the scope of the invention.

For example, although the insulator 26 is used for retaining a crossover of the winding 23 of the stator 20, the invention is not limited to this only if the crossover can be retained. More specifically, an inner peripheral edge of lowest one of the plurality of thin plates constitute the stator 20 may be bent axially upward at an intermediate position in the circumferential direction of the teeth 22.

Although the extending portion 11 of the base 10 is provided with the step 12 in the embodiment, the invention is not limited to this shape. It is only necessary that the height of the upper surface of the through hole 12a on the radially inner side and the height of the lower surface of the through hole 12a on the radially outer side as viewed from the rotation center axis are different from each other. That is, an inclined surface may be formed instead of the step 12.

What is claimed is:

1. A spindle motor comprising:
   a rotor which is coaxially disposed with a center axis and which is provided at its outer periphery with a rotor magnet;
   a stator which surrounds the rotor and which is disposed at a gap from the rotor magnet in a radial direction;
   a base having a recess which is opened upward for accommodating the stator, and when a side of the base opposed to the rotor is defined as inside and a side of the base that is opposite from the inside is defined as outside, the recess is located inside; and
   a flexible circuit substrate having one end connected to an upper side of the stator, wherein:
      the circuit substrate has an external connecting portion connected to an external power supply;
      the base is provided, in a portion thereof radially outward of the recess as viewed from the center axis, with an extending portion having a through hole through which the external connecting portion penetrates from the back side to the front side of the base; and
      an inclined surface is formed on an open end of the through hole along an inward part of the base, and along the through-hole radially inner side as viewed from the center axis, the diameter thereof becomes greater toward the open end.

2. The spindle motor according to claim 1, wherein a surface of the extending portion which is inside of the base and the circuit substrate is to be attached to is formed so that a portion of the surface on the radially outer side than a position of the through hole is higher in the axial direction of the center axis than a portion of the surface on the radially inner side.

3. A recording disk drive comprising:
   a recording disk having a magnetic recording layer;
   a spindle motor for rotating the magnetic disk;
   a magnetic head which records information on the magnetic recording layer and which reproduces information recording on the magnetic recording layer; and
   a moving unit which moves the magnetic head with respect to the recording disk,
   wherein the spindle motor comprises:
   a rotor which is coaxially disposed with a center axis and which is provided at its outer periphery with a rotor magnet;
   a stator which surrounds the rotor and which is disposed at a gap from the rotor magnet in a radial direction;
   a base having a recess which is opened upward for accommodating the stator, and when a side of the base opposed to the rotor is defined as inside and a side of the base that is opposite from the inside is defined as outside, the recess is located inside; and
   a flexible circuit substrate having one end connected to an upper side of the stator, wherein:
      the circuit substrate has an external connecting portion connected to an external power supply;
      the base is provided, in a portion thereof radially outward of the recess as viewed from the center axis, with an extending portion having a through hole through which the external connecting portion penetrates from the back side to the front side of the base; and
      an inclined surface is formed on an open end of the through hole along an inward part of the base, and along the through-hole radially inner side as viewed from the center axis, the diameter thereof becomes greater toward the open end,
   wherein a surface of the extending portion which is inside of the base and the circuit substrate is to be attached to is formed so that a portion of the surface on the radially outer side than a position of the through hole is higher in the axial direction of the center axis than a portion of the surface on the radially inner side.

* * * * *